Oct. 28, 1958 R. A. MAGNUSON 2,857,815
EQUILIBRATOR SYSTEM FOR A VEHICLE MOUNTED GUN
Filed Jan. 11, 1957 3 Sheets-Sheet 1
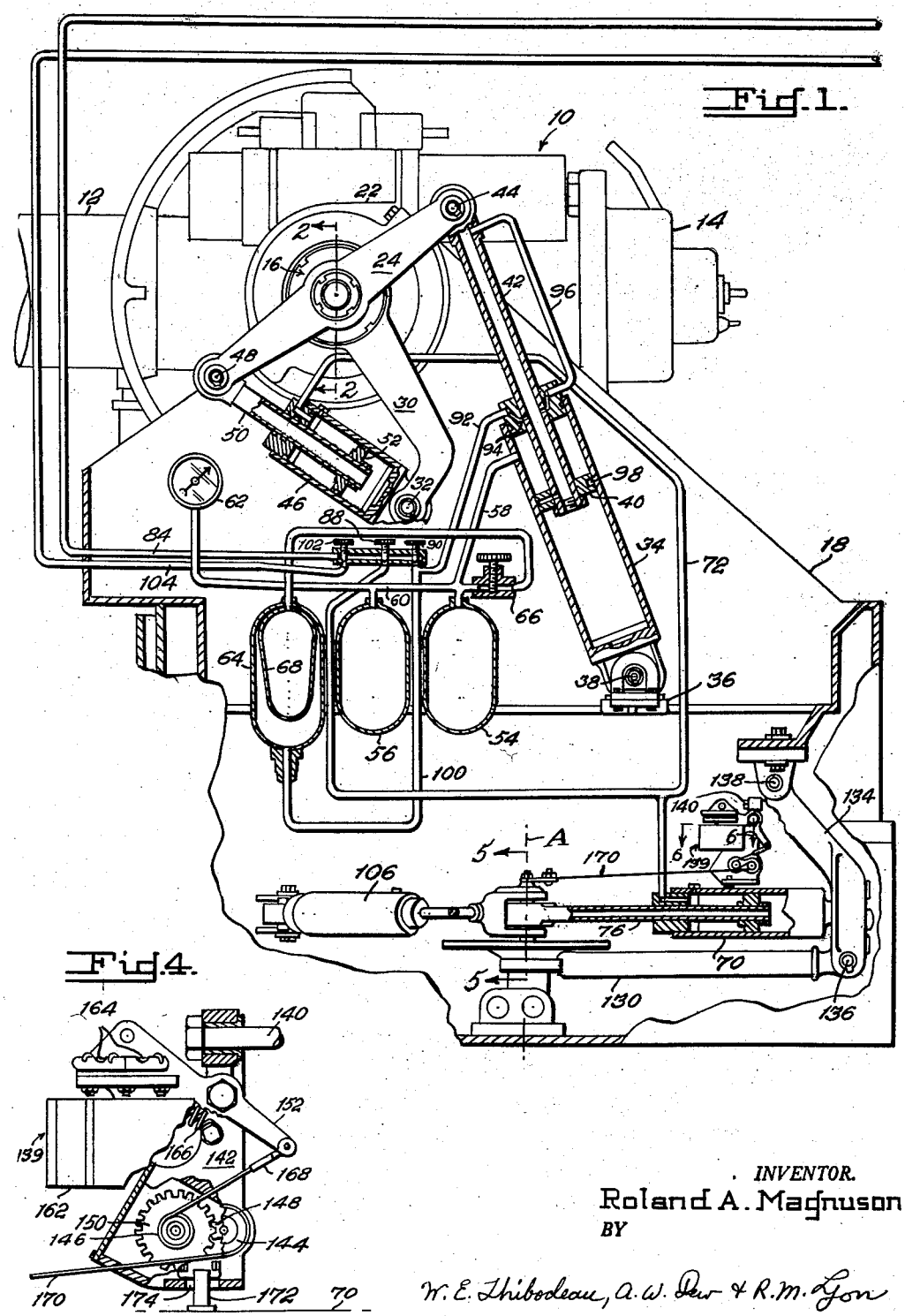
INVENTOR.
Roland A. Magnuson
BY
W. E. Thibodeau, A. W. Dew & R. M. Lyon

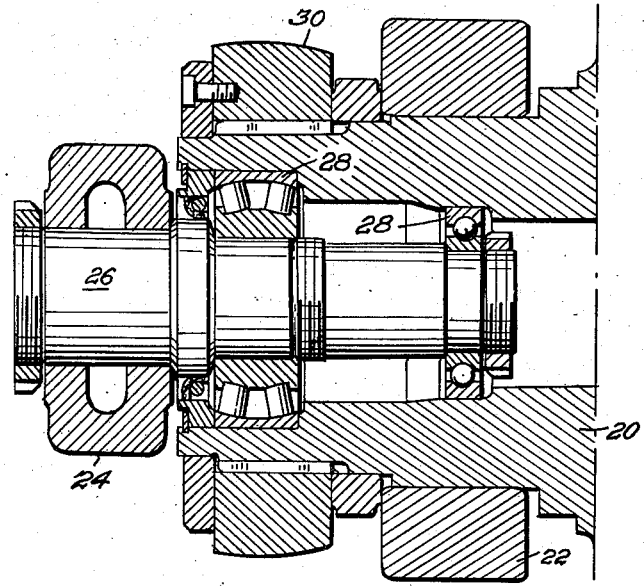
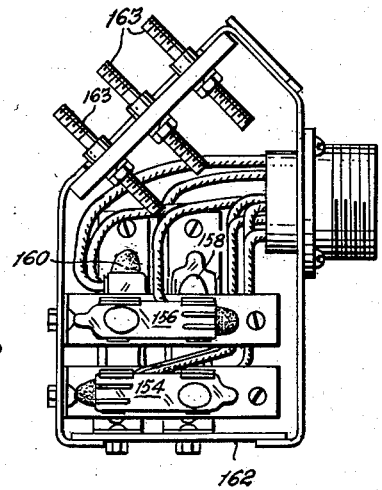
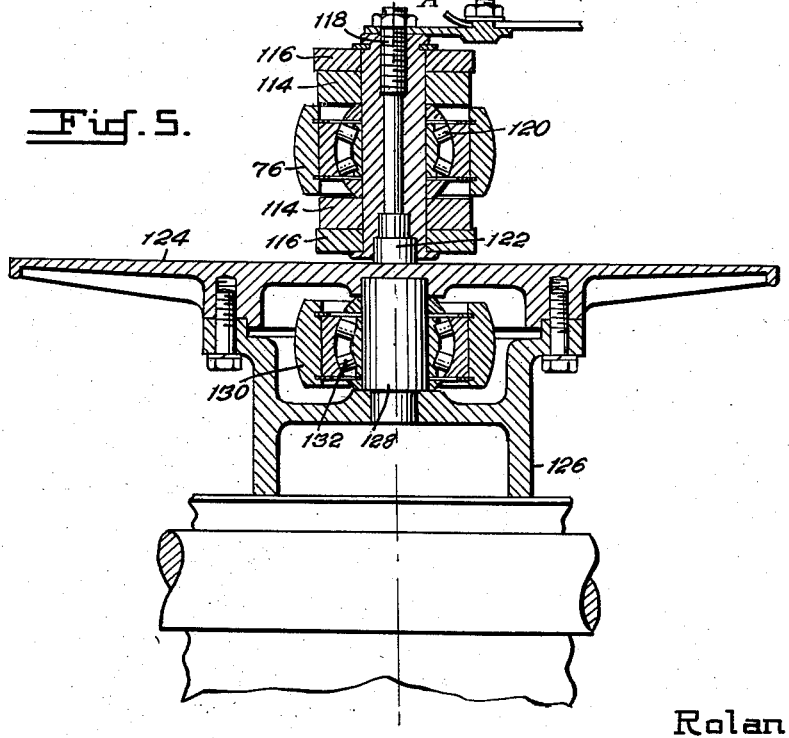
INVENTOR.
Roland A. Magnuson

Oct. 28, 1958  R. A. MAGNUSON  2,857,815
EQUILIBRATOR SYSTEM FOR A VEHICLE MOUNTED GUN
Filed Jan. 11, 1957  3 Sheets-Sheet 3

INVENTOR.
Roland A. Magnuson
BY
W. E. Thibodeau, A. W. Pew & R. M. Lyon

United States Patent Office 2,857,815
Patented Oct. 28, 1958

2,857,815
EQUILIBRATOR SYSTEM FOR A VEHICLE MOUNTED GUN

Roland A. Magnuson, Seattle, Wash., assignor to the United States of America as represented by the Secretary of the Army Application January 11, 1957, Serial No. 633,808

12 Claims. (Cl. 89—37)

The invention relates to an equilibrator system, particularly an equilibrator system for use with Ordnance vehicles.

In the mounting of large guns or howitzers the problem of balancing the gun arises as the center of gravity is located well forward of the trunnion, therefore the gun barrel would pivot downwardly if means were not provided to counteract the unbalanced forces. A device known as an equilibrator is used for this purpose and exerts a force on the gun opposite to that force caused by gravity acting on the gun barrel.

The above mentioned problems of unbalance become greater and more difficult to compensate for when the gun is mounted in a vehicle, as the location of the vehicle on a slope of any kind will change the magnitude and direction of the gravity force on the gun and gun turret and consequently require changes in the force exerted by the equilibrator.

It will therefore be understood that the equilibrator, in effect, makes the gun act as though the trunnions were located at the center of gravity and the only work done in elevating the gun is that required to overcome friction in the moving parts. Thus, the equilibrator permits small, high speed motors to operate a massive gun.

It is therefore an object of the invention to produce an equilibrator which will effectively counterbalance a gun irrespective of angular displacement of the gun supporting structure.

A further object of the invention is to design an equilibrator which is lightweight, compact and is gas operated.

A yet further object of the invention is to produce an equilibrator system, which will automatically compensate for unbalanced forces created by the vehicle resting on a slope and counterbalance both the weight of the gun barrel and the tendency of the turret to swing downhill.

Another object of the invention is to design an equilibrator system wherein the compensating means are hydraulically actuated, the equilibrator is gas operated and hydraulic means are used to regulate the gas pressure.

Other objects of the invention will be apparent from the following description and illustration of an embodiment of the invention wherein:

Fig. 1 is an elevational view of the equilibrator system, partly in section.

Fig. 2 is a cross-section elevation of the trunnion taken along the line 2—2 of Fig. 1.

Fig. 4 is an elevational section of the control assembly taken along line 4—4 of Fig. 3.

Fig. 5 is a section of the movable cylinder junction taken along the line 5—5 of Fig. 1.

Fig. 6 is a plan sectional view of the switch box taken along the line 6—6 of Fig. 1.

Figure 3:
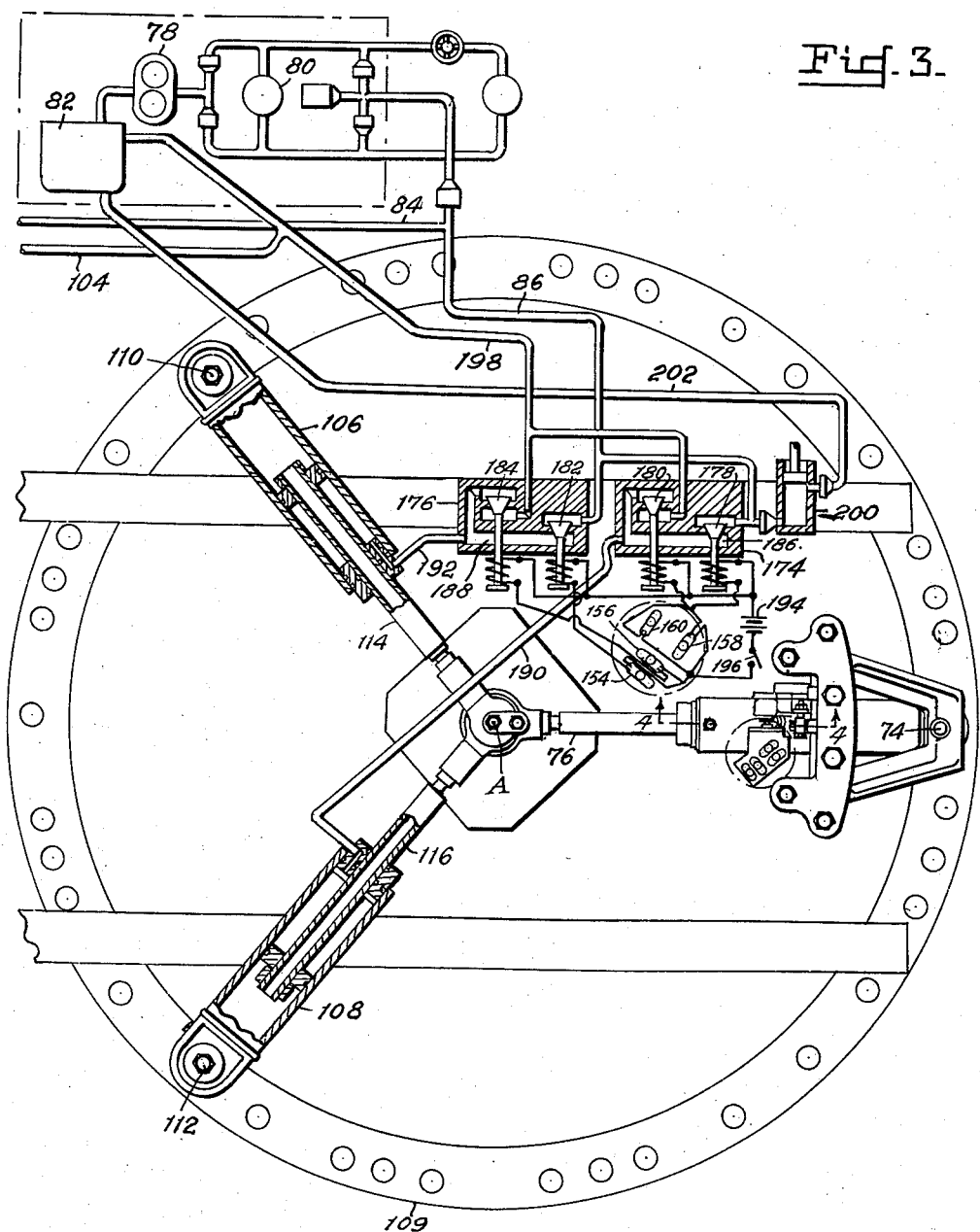
Fig. 3 is a plan view of the automatic compensating means, portions of the electric circuit being shown schematically.

Equilibrators are used on guns and howitzers whether stationary or vehicle mounted, however the instant equilibrator system has particular use with vehicle mounted guns and the invention will be described as used with this type of gun.

The gun 10 consists of a barrel 12 and breech 14 which are pivotally supported on a trunnion 16, the entire mechanism being rotatably mounted in a turret 18. It will be thus observed that the gun barrel may be lowered or elevated through the trunnion support and traversed by the turret rotation.

As seen in Fig. 2, the trunnion 16 structure consists of a shaft 20 extending from the breech 14 and supported by bracket 22. Shaft 20 is rotatably mounted within bracket 22 and carries lever 24 rotatably supported thereon through shaft 26 and anti-friction bearings 28. An arm 30 is fixed to the shaft 20 for rotation therewith and is formed with a pivot pin 32 for a purpose later described.

The vertical equilibrator cylinder 34 is pivotally fixed to the turret 18 by a bracket 36 and pin 38, and contains a piston 40 connected to a tubular piston rod 42. The outer end of the piston rod 42 is pivotally fastened to the lever 24 by a pin 44, therefore it will be seen that reciprocation of the piston rod 42 will cause lever 24 to pivot relative to the trunnion 16.

The vertical adjusting cylinder 46 forms the connection between arm 30 and lever 24; this is accomplished by pivot pin connection 32 and a pivot pin 48 connecting piston rod 50 to the lever 24. It will be seen that a piston 52 is fastened to the piston rod 50 for reciprocation within the vertical adjusting cylinder 46. Thus, movement of piston rod 42 will cause lever 24 to rotate thereby transmitting a torque to lever 30, via rod 50 and cylinder 46, to impart forces to the shaft 20 thereby counterbalancing the weight of the gun.

The energy required to exert the necessary equilibrator force is derived from gas under high pressure, acting upon the piston 40. Any type of stable gas may be used, however, nitrogen is preferred as the inert and non-corrosive qualities are highly desirable. The gas is stored in reservoirs which are shown in Fig. 1 in the form of bottles 54 and 56. A conduit 58 conducts the gas from the reservoirs to the cylinder 34 while conduit 60 is connected to a pressure gage 62. In order to vary the gas pressure, an accumulator 64 is included in the system and may be utilized through the operation of the accumulator gas valve 66. The pressure in the accumulator 64 may be varied by changing the volume of the gas containing bladder 68 whose operation will be later described. Therefore, it will be observed that the gas pressure in cylinder 34 will counteract the unbalanced condition of the gun when the gun is on level terrain.

However, if the gun carrying vehicle is on a slope, the angular pitch forward or backward and the side cant will cause the force acting on the gun's center of gravity to change in direction and magnitude as the gun's unbalance is a function of its elevation with respect to a horizontal line and the cant will tend to cause the gun and turret to swing downhill.

These varying forces are compensated for by the operation of the vertical adjusting cylinder 46 whereby operation of the cylinder 46 and rod 50 to rotate lever 24 through an angle equal to the pitch of the vehicle will adjust the equilibrator gas pressure to suit the true elevation of the gun 10.

Basically, the compensating means comprises a horizontal equilibrator cylinder 70 which functions as a master cylinder to operate cylinder 46 through a conduit 72. The cylinder 70 is pivotally connected to a turret supported bracket at pin 74, Fig. 3, and piston rod 76 is fastened to a vertical axis A which is adjustably positioned in relation to the vehicle hull or frame. Therefore, when the axis A is coincident with the axis of turret rotation, traversing the turret 18 will not cause the piston rod 76 to reciprocate thereby not changing the setting of the vertical adjusting cylinder 46; this would be the position of axis A when the vehicle is upon level terrain. When the vehicle is upon a slope or hill, the axis A is moved from the center of turret rotation in the direction of the slope and a distance proportional to the angular magnitude thereof. When axis A is thus displaced, the initial movement will cause rod 76 to reciprocate which will adjust the cylinder 46 and lever 24 for the initial pitch. Traverse of the turret 18 will cause piston rod 76 to reciprocate due to the changing distance from axis A to pin 74 accomplishing two things; first, the oil displacement caused by the movement of piston rod 76 will actuate the cylinder 46, placing the lever 24 in adjustment for the changing pitch, and second, the force causing the adjustment for pitch develops a torque about the center of rotation of turret 18 equal and opposite to the tendency of the gun to swing downhill thereby also equilibrating the turret.

The compensating means for the equilibrator system is fluid operated and obtains pressurized fluid from the same hydraulic pumps which are used to rotate the turret 18. From Fig. 3 it will be noted that pumps 78 and 80 draw hydraulic fluid from a reservoir 82 and supply fluid under pressure to conduits 84 and 86. Conduit 84 supplies fluid to the vertical adjusting cylinder 46 and horizontal equilibrator cylinder 70 through an equilibrator oil valve 88, thus, when valve 88 is opened, the cylinders 46 and 70 will be filled with fluid; when the above mentioned cylinders are full, the valve 88 is closed and cylinders 46 and 70 operate as disclosed above, in a closed servo-system.

An accumulator oil valve 90 permits pressurized fluid to flow through conduit 92 into an annular chamber 94 surrounding piston rod 42, another conduit 96 opens into chamber 94 for transmitting fluid through piston rod 42 to the annular chamber 98 formed in the periphery of piston 40. As high pressure fluid, preferably oil, is introduced into chambers 94 and 98, the pressure of the oil, being greater than the pressure of the gas within cylinder 34, will cause the oil to slowly seep into the cylinder thereby preventing any escape of gas. Therefore, the fluid flowing through conduit 92 is used for sealing gas cylinder 34 and also acts to lubricate the moving parts thereof.

Fluid introduced into conduit 100 is used to vary the volume, and hence the pressure, of the gas in accumulator 64. When valve 90 is opened, the pressure of the fluid within accumulator 64 will, since the fluid pressure is greater than the gas pressure, cause bladder 68 to collapse thereby increasing the gas pressure. Thus, if a higher gas pressure is desired, valve 90 is opened causing the bladder 68 to be reduced in size increasing the gas pressure of the accumulator 64, conversely should it be desired to reduce the gas pressure, the fluid is permitted to flow from the accumulator 64 via opened oil drain valve 102 through conduit 104 to the reservoir 82.

The mechanism for positioning the axis A in accordance with the pitch and cant of the vehicle consists of hydraulic cylinders 106 and 108, Fig. 3, which are pivotally connected to the frame 109 of the vehicle, below the turret 18, by pins 110 and 112 respectively. Piston rods 114 and 116 are formed with yokes at the outermost ends and together with piston rod 76 are pinned at the axis A by a pin 118, as seen in Fig. 5. The piston rod 76 is journaled to pin 118 by anti-friction bearings 120 to permit accurate and non-binding operation. A bearing 122 protrudes from the bottom of pin 118 and slides upon a supporting table 124 which is fixed to the frame of the vehicle by bracket 126. A pin 128 carried between table 124 and bracket 126 pivotally supports a strut 130 through anti-friction bearings 132. It will thus be observed that the junction of the piston rods; e. g. axis A, will be slidably supported by the table 124.

The strut 130 is connected to the bracket 134 by pin 136 thereby supporting the lower end of bracket 134. The upper end of the bracket 134 is fixed to the turret 18 by pin 138. As mentioned earlier in the specification, the cylinder 70 is pivotally connected to the turret 18 by pin 74 which is fixed in bracket 134. Therefore, as the turret 18 rotates, the bracket 134 will also rotate as though an integral member of the turret.

The control assembly 139, Fig. 4, hangs from a pivot pin 140, extending from bracket 134, permitting a pendulous movement. The control assembly 139 consists of housing 142 on which are supported winches 144 and 146 geared together by spur gears 148 and 150, the gear ratios being such that a large angular displacement of winch 144 results in a small angular displacement of winch 146. A bracket 152 is pivotally fastened to housing 142 and carries the mercury switches 154, 156, 158 and 160 within switchbox 162, which is connected to bracket 152 by adjusting screws 163. The switches are arranged in pairs at right angles to each other whereby any deviation of the vehicle from a level position will cause at least one of the switches to be closed. A pair of levels 164 are arranged in the same relationship as the switches and are also supported by bracket 152 for a purpose to be described hereinafter. A spring 166 acting on bracket 152 tends to tip the switch box 162 and levels 164 forward, while a cable 168 from bracket 152 to winch 146 counteracts the spring pressure. In order that the switch box 162 will follow up movement of the equilibrator system a cable 170 connects axis A to winch 144; and a stud 172, carried by cylinder 70, extends into an oblong slot 174 of housing 142.

Thus, movements of axis A in a direction parallel to the gun barrel 12 will cause the cable 170 to rotate winch 144 which causes winch 146 to be operated through gears 148 and 150 tilting bracket 152 and switch box 162 forward or backward depending on the direction of movement of axis A. Movement of axis A transverse to gun barrel 12 will pivot cylinder 70 about pin 74 causing housing 142 to pivot about pin 140 due to the force exerted on housing 142 by stud 172 acting on the side of slot 174. Thus, any movement of axis A, other than in the two above mentioned directions, will produce a combination of tilting and pivoting of the control assembly 139.

The switches 154, 156, 158 and 160 are connected to solenoid operated valves as shown in Fig. 3. The conduit 86 supplies hydraulic fluid under pressure to valve blocks 174 and 176, valve block 174 contains intake valve 178 and exhaust valve 180 which communicate with chamber 186 while valve block 176 contains similar intake valve 182 and exhaust valve 184 opening into chamber 188, each of the valves are operated by separate solenoids and have stems which extend from the valve blocks permitting manual operation.

A conduit 190 connects the chamber 186 with the cylinder 108 and conduit 192 permits fluid communication between chamber 188 and cylinder 106.

The mercury switch circuit consists of an electric power source, normally a battery 194, and a leveling switch 196. The mercury switches are connected such that the closing of switch 154 will open valve 182, switch 156 opens valve 184 and switches 158 and 160 open valves 180 and 178 respectively when operated by the mercury bubble. Thus, the closing of switch 160 will open valve 178 allowing fluid to enter chamber 186, conduit 190 and actuating cylinder 108 thereby moving axis A toward the cylinder 108. Actuation of switch 154 will draw axis A toward cylinder 106. As cylinders 106 and 108 are of the single action type, the force exerted by the fluid within cylinder 70 will move axis A toward cylinder 70 upon the closing of either switch 156 or 158, thereby opening valves 184 or 180 and permitting the pressure within cylinders 106 or 108 to exhaust to the reservoir 82 through conduit 198. Thus, it will be understood that axis A may be moved in any direction upon table 124 upon the operation of the proper combination of switches 154, 156, 158 and 160.

The operation of the equilibrator system is as follows:

While the vehicle is upon level terrain the gas pressure in the vertical equilibrator cylinder 34 will be initially adjusted by varying the gas pressure within accumulator 64 such that the weight of the gun barrel 12 will be completely counterbalanced. By opening valves 90 and 66 the operator will introduce fluid pressure into the accumulator 64 and by observing gage 62 may determine when the proper gas pressure is reached, valve 66 and valve 90 would then be closed; it will be noted that the fluid within chambers 94 and 98 will also be put under pressure with the opening of valve 90. Valve 88 will also be opened to fill cylinders 46 and 70 with hydraulic fluid and closed again once this operation is accomplished. The gun 10 will now be balanced by the equilibrator system and since the vehicle is upon level terrain the initial position of axis A, coincident with the axis of turret rotation, will not cause reciprocation of the piston rod 76 as the turret is traversed. Thus, small motors may be used to elevate and rotate the gun 10 easily and quickly.

Now assume for purposes of illustration that the vehicle is upon a slope wherein the vehicle is pitched 15° below the horizontal and canted 8° to the left. No further adjustment of the gas pressure will be needed, however, the change in direction of the gravitational forces acting in barrel 12 and the tendency for the barrel 12 to swing downhill must be compensated for. This is accomplished by the operator closing leveling switch 196. Upon the actuation of switch 196 the valves 184 and 178 will be opened due to the pitch and cant of the vehicle closing mercury switches 156 and 160 respectively, thus piston rod 116 will be drawn into cylinder 108 and piston rod 114 will travel outwardly from cylinder 106, the resultant movement causing axis A to move downward and to the left as viewed in Fig. 3. As axis A is traversing table 124, cable 170 will rotate winches 144 and 146 in turn causing bracket 152 and switch box 162 to pivot upwardly in the opposite direction to the pitch of the vehicle. Simultaneously the movement of axis A will cause cylinder 70 to move downwardly carrying stud 172, stud 172 will pivot housing 142 and switch box 162 about pin 140 tending to level the switch box. It will therefore be understood that the axis A will be moved in the direction of the slope of the vehicle a distance proportional to the magnitude of the slope and that the leveling of switch box 162 due to the combined motion produced by cable 170 and stud 172 will continue until the mercury switches are level and all the valves 178—184 are closed, at which time axis A will be properly positioned. The switch 196 is then opened and the gun is now effectively counterbalanced and ready to be fired.

As the axis A is traversed, the movement of piston rod 76 will increase or decrease the volume of fluid in cylinder 70 thereby causing a change in the fluid volume of cylinder 46 reciprocating piston rod 50 and pivoting lever 24 about trunnion 16. As axis A is moved a distance proportional to the pitch of the vehicle, the volumes of cylinders 46 and 70 are such that the arm 24 will be rotated through an angle equal to the pitch, therefore, since the vertical equilibrator cylinder 34 is also connected to lever 24, the equilibration is adjusted to the true elevation of the gun barrel 12.

The slope of the vehicle will also tend to cause the gun barrel to swing downhill, however, since the axis A is now offset from the axis of turret rotation, the fluid pressure within cyinler 70, acting upon cylinder 70, piston rod 76 and pins 74 and 118, will develop a torque upon turret 18 equal and opposite to the tendency of the gun barrel to swing downhill thereby permitting the turret to be rotated by relatively small power means.

While the vehicle is upon any given slope, the gun will be automatically adjusted for proper equilibration, even though the turret is rotated and changing forces imposed upon the gun barrel, as the offset position of axis A will cause the distance from axis A and pin 74 to change as the turret is rotated thereby changing the fluid volume in cylinder 70 and consequently rotating lever 24 to the proper pitch angle and at the same time changes the torque exerted on the turret 18 by cylinder 70 and piston rod 76 for the most effective balance.

It will be understood that each time the vehicle changes firing position the leveling switch 196 must be closed to compensate for the changing slope of the vehicle.

Should the power system of the vehicle fail, a hand pump 200 may be manually operated to draw fluid through conduit 202 to supply valve blocks 174 and 176. By manually operating valves 178—184 cylinders 106 and 108 may be actuated to move axis A in the desired direction to compensate for the pitch and cant of the vehicle. The operator may determine when axis A is properly positioned by observing the bubbles within the levels 164 which are carried by bracket 152 and thus will be responsive to movement of the axis A in the same manner as switches 154—160. When the bubbles of the levels 164 are centered, the equilibrator system will be properly adjusted.

It is thus seen that the disclosed invention produces an equilibrator system which will accurately balance the weight of the gun and counteract the tendency of the turret to swing downhill therefore enabling small motors to be used for aiming and elevating the gun.

The use of gas enables a powerful weight compensating means to be compact enough for use in a vehicle while the use of fluid to control the slope compensating means provides accurate and rapid operation.

It will be understood that various modifications and equivalents may occur to those skilled in the art without departing from the spirit and scope of the invention and it is not intended that the invention be confined to the specific construction described except as limited by the appending claims.

I claim:

1. An equilibrator system for a vehicle mounted turret gun comprising, a trunnion supporting said gun, an arm fixed to said trunnion, a lever rotatably supported by said trunnion, a counterbalancing piston and cylinder assembly connected to said lever, gaseous means within said cylinder, a compensating piston and cylinder assembly interposed between said arm and said lever, hydraulic fluid within said compensating assembly, a master cylinder pivotally fastened to said turret in fluid connection with said compensating cylinder assembly, control means carried by said vehicle responsive to the horizontal position thereof and power means operated by said control means in operative connection with said master cylinder whereby said compensating cylinder is adjusted in accordance with the horizontal relationship of the vehicle.

2. An equilibrator system for vehicle mounted turret guns comprising, a trunnion supporting said guns, an arm fixed to the trunnion, a lever rotatably supported by said trunnion, a counterbalancing piston and cylinder assembly fixed to said lever, gaseous pressure means within said cylinder, a compensating piston and cylinder interposed between said arm and said lever, fluid means within said compensating cylinder, a master cylinder carried by the turret in fluid connection with said compansating cylinder, control means carried by said vehicle responsive to the horizontal position thereof, power means operated by said control means and in operative connection with said master cylinder, and follow-up means interconnecting said power means and control means whereby said control means are responsive to the operation of said power means.

3. An equilibrator system as in claim 2 wherein said control means comprises, a pivotally supported switch box, a series of mercury switches carried within said switch box, solenoid actuated valves controlled by said switches and conduit means connecting said valves to said power means.

4. An equilibrator system as in claim 3 wherein the power means comprises, a pair of hydraulic cylinders fixed to the frame of the vehicle, piston rods in said pair of hydraulic cylinders, and a pin connecting the piston rods of said pair of hydraulic cylinders and said master cylinder at a common point.

5. An equilibrator system as in claim 4 wherein the follow-up means comprises, a cable fastened between said pin and said switch box, and a stud carried by said master cylinder operatively connected to said switch box.

6. An equilibrator system for a vehicle mounted gun comprising a turret on said vehicle rotatable about an axis, a trunnion supporting said gun, said trunnion being mounted on said turret, an arm fixed to said trunnion, a lever rotatably supported on said trunnion, counterbalancing means attached to said lever for exerting a force on said trunnion, fluid compensating means interposed between said arm and said lever for varying the force exerted on said trunnion by said counterbalancing means, a master cylinder pivotally connected to said turret, fluid conduit means connecting said master cylinder with said compensating means, a piston and piston rod in said master cylinder, a pin having an axis coincident with said axis of rotation of said turret when said vehicle is in a level position, said piston rod pivotally connected to said pin, power means connected to said pin for varying the position and thereby the axis of said pin, means on said vehicle responsive to deviations of said vehicle from a level position, said responsive means controlling said power means so that when said vehicle deviates from a level position said responsive means actuates said power means causing movement of said pin and thereby said piston rod in said master cylinder thereby actuating said compensating means through said conduit means whereby the force exerted by said counterbalancing means is adjusted in accordance with the deviation of said vehicle from a level position.

7. An equilibrator system as defined in claim 6 in which said counterbalancing means comprises a cylinder pivotally connected to said turret, a piston and piston rod in said cylinder, said piston rod pivotally connected to said lever and a gaseous fluid in said cylinder exerting a force on said piston and thereby said lever and trunnion whereby said gun is counterbalanced.

8. An equilibrator as defined in claim 6 in which said compensating means comprises a cylinder pivotally connected to said arm, a piston and piston rod in said cylinder, said piston rod pivotally connected to said lever, and a fluid in said cylinder exerting a force on said lever through said piston rod.

9. An equilibrator system as defined in claim 6 in which said responsive control means comprises a pivotally supported switch box, a series of mercury level switches in said box, said switches being open when said mercury is in a level position, solenoid operated valves controlled by said switches, said valves being closed when said switches are open and conduit means connecting said valves to said power means so that when said vehicle deviates from a level position said switches close thereby opening said valves and actuating said power means.

10. An equilibrator system as defined in claim 6, in which said power means comprises a pair of cylinders fixed to said vehicle, pistons and piston rods in said cylinders, conduit means connecting said cylinders with said control means, said piston rods being connected to said pin so that on actuation of said piston rods by said control means said pin and thereby said axis of said pin is moved to new position.

11. An equilibrator as defined in claim 6 and further comprising means connecting said power means with said control means so that said control means is responsive to the operation of said power means.

12. An equilibrator as defined in claim 11 in which said means connecting said power means and said control means comprises a cable fastened to said pin and said switch box and a stud carried by said master cylinder and operatively connected to said switch box.

References Cited in the file of this patent

UNITED STATES PATENTS

| | | |
|---|---|---|
| 749,214 | McClean | Jan. 12, 1904 |
| 2,754,725 | Flem | July 17, 1956 |